United States Patent
Syeda-Mahmood

(10) Patent No.: US 8,195,693 B2
(45) Date of Patent: Jun. 5, 2012

(54) AUTOMATIC COMPOSITION OF SERVICES THROUGH SEMANTIC ATTRIBUTE MATCHING

(75) Inventor: Tanveer Syeda-Mahmood, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1842 days.

(21) Appl. No.: 11/013,485

(22) Filed: Dec. 16, 2004

(65) Prior Publication Data

US 2006/0136428 A1 Jun. 22, 2006

(51) Int. Cl.
G06F 7/00 (2006.01)
G06F 17/30 (2006.01)

(52) U.S. Cl. ........ 707/790; 707/791; 707/797; 707/798; 707/802; 707/803

(58) Field of Classification Search .......... 707/790, 707/791, 797, 798, 802, 803, 999.1, 999.101, 707/999.102
See application file for complete search history.

(56) References Cited

U.S. PATENT DOCUMENTS

| | | | |
|---|---|---|---|
| 4,919,768 A | 4/1990 | Bladon | |
| 5,114,834 A | 5/1992 | Nachshon | |
| 5,342,501 A | 8/1994 | Okabayashi | |
| 5,911,139 A * | 6/1999 | Jain et al. | 707/999.003 |
| 5,970,490 A | 10/1999 | Morgenstern | |
| 6,040,214 A | 3/2000 | Boyd et al. | |
| 6,117,784 A | 9/2000 | Uzoh | |
| 6,125,361 A | 9/2000 | Chakrabarti et al. | |
| 6,440,839 B1 | 8/2002 | Partovi et al. | |
| 6,506,293 B1 | 1/2003 | Rumpf | |
| 6,618,725 B1 | 9/2003 | Fukuda et al. | |
| 6,653,231 B2 | 11/2003 | Okoroanyanwu et al. | |
| 6,660,154 B2 | 12/2003 | Merricks et al. | |
| 6,713,396 B2 | 3/2004 | Anthony | |
| 6,714,939 B2 | 3/2004 | Saldanha et al. | |
| 6,745,368 B1 | 6/2004 | Boucher et al. | |

(Continued)

FOREIGN PATENT DOCUMENTS

JP 56-87329 7/1981

(Continued)

OTHER PUBLICATIONS

Caragea et al. "Semantic API Matching for Automatic Service Composition", ACM, May 2007, pp. 436-437. Download: http://dl.acm.org/citation.cfm?id=1013513.*

(Continued)

Primary Examiner — Hares Jami
(74) Attorney, Agent, or Firm — Gibb I.P. Law Firm, LLC

(57) ABSTRACT

A method of automatically matching schemas begins by extracting schemas from sources and targets. Then, source and target attributes are extracted from the schemas. Each source schema will have multiple source attributes and each target schema will also have multiple target attributes. The source attributes and the target attributes are presented as nodes in a bipartite graph. This bipartite graph has edges between nodes that are related to each other. A plurality of similarity scores are defined between each set of related nodes. Each of the similarity scores is based on a different context-specific cue of the attributes that the nodes represent. These context-specific cues can comprise lexical name, semantic name, type, structure, functional mappings, etc. An overall weight is computed for each edge in the bipartite graph by combining the similarity scores of each set of nodes that form an edge.

18 Claims, 9 Drawing Sheets

U.S. PATENT DOCUMENTS

| | | | |
|---|---|---|---|
| 6,826,568 B2 * | 11/2004 | Bernstein et al. | 707/6 |
| 6,985,898 B1 * | 1/2006 | Ripley et al. | 707/999.005 |
| 6,985,905 B2 * | 1/2006 | Prompt et al. | 707/102 |
| 7,225,184 B2 | 5/2007 | Carrasco et al. | |
| 7,933,915 B2 * | 4/2011 | Singh et al. | 707/760 |
| 2002/0133497 A1 | 9/2002 | Draper et al. | |
| 2003/0121005 A1 | 6/2003 | Herbst et al. | |
| 2003/0203636 A1 | 10/2003 | Anthony | |
| 2004/0236737 A1 | 11/2004 | Weissman et al. | |
| 2004/0249824 A1 | 12/2004 | Brockway et al. | |
| 2005/0015366 A1 | 1/2005 | Carrasco et al. | |
| 2005/0055365 A1 * | 3/2005 | Ramakrishnan et al. | 707/102 |
| 2005/0055369 A1 * | 3/2005 | Gorelik et al. | 707/102 |
| 2005/0120273 A1 * | 6/2005 | Hudson et al. | 714/38 |
| 2005/0246321 A1 | 11/2005 | Mahadevan et al. | |
| 2006/0136428 A1 | 6/2006 | Syeda-Mahmood | |

FOREIGN PATENT DOCUMENTS

| | | |
|---|---|---|
| JP | 10-261710 | 9/1998 |

OTHER PUBLICATIONS

Rahm et al., "A survey of approaches to automatic schema matching", ACM, Dec. 2001, pp. 334-350. Download: http://dl.acm.org/citation.cfm?id=767154.*

Xiao Long Sun and Ellen Rose, "Automated Schema Matching Techniques: An Exploratory Study", 2003.

Bergamaschi et al. "Semantic Integration of Heterogenous Information Sources", Data and Knowledge Engineering, 36 (3), Mar. 2001, pp. 215-249.

Boag et al. "Xquery 1.0: An XML Query Language", 2004, http://www.w3.org/TR/2004/WD-xquery-20041029.

Caragea et al. "Semantic API Matching for Automatic Service Composition", Proceedings of the ACM WWW Conference, Jun. 2004, pp. 436-437.

Carmel et al. "Searching XML Documents Via XML Fragments", Proceedings of the 26th Annual International ACM SIGIR, Jul. 2003, pp. 151-158.

Christensen et al., Web Services Description Language (WSDL) 1.1, 2001 http://www.w3.org/TR/wsdl.

Do et al., "COMA: A System for Flexible Combination of Schema Matching Approaches" Proceedings of the ACM SIGMOD, May 2001.

Doan et al., "Reconciling Schemas of Disparate Data Sources: A Machine-Learning Approach", Proceedings of the ACM SIGMOD, May 2001.

Dong et al., "Similarity Search for Web Services", Proceedings of the 30th International Conference on Very Large Databases, Aug. 2004, pp. 372-383.

IBM Corporation, "Developer Works: IBM's Resource for Developers", http://www-130.ibm.com/developerworks.

Madhavan et al. "Corpus-Based Schema Matching", Proceedings of the Information Integration on the Web, Aug. 2003, pp. 59-66.

Rahm et al., "A Survey if Approaches to Automatic Schema Matching", VLDB Journal, 10(4), 2001, pp. 334-350.

Sperberg et al., "XML Schema", 2005, http://www.w3.org/XML.Schema.html.

Roth et al., U.S. Appl. No. 11/126,125, Office Action Communication, Apr. 13, 2009, 14 Pages.

Berners-Lee et al. The Semantic Web Scientific American, pp. 1-6. 2001.

T.H. Cormen et al., "Introduction to Algorithms," Chapter 27, Maximum Flow,New York: McGraw Hill, Cambridge: MIT Press, pp. 580-6041990.

A. Goldberg et al., "An Efficient Cost-Scaling Algorithm for the Assignment Problem," SIAM Journal on Discrete Mathematics, 6(3):443-459, 1993.

Blythe J. et al., "The role of planning in grid computing," In Proc. ICAPS, pp. 1-10, 2003.

Jayant Madhavan et al., "Generic Schema Matching With Cupid," In the VLDB Journal, pp. 49-58, 2001.

D. McDermott, "Estimated regression planning for interactions with web services," In Proc. A1PS,pp. 1-9, 2002.

S. Melnik et al., "Similarity Flooding: A Versatile Graph Matching Algorithm and its Application to Schema Matching," In Proc. ICDE, pp. 1-12, 2002.

G.A. Miller, "Wordnet: A lexical database for English," Communications of the ACM, 38(11'): pp. 39-41, 1995.

Renée J. Miller et al., "The Clio Project: Managing Heterogeneity". SIGMOD Record (ACM Special Interest Group on Management of Data), 30(1):pp. 78-83, 2001.

Evren Sirin et al., "Semi-Automatic Composition of Web Services Using Semantic Descriptions", University of MD, College Park, MD, pp. 1-9.

T.F. Smith et al.,"Identification of Common Molecular Subsequences", Journal of Mol. Biol., vol. 147:195-197,pp. 195-197, 1981.

* cited by examiner

AUTOMATIC COMPOSITION OF SERVICES THROUGH SEMANTIC ATTRIBUTE MATCHING

BACKGROUND OF THE INVENTION

1. Field of the Invention

The invention generally relates to an approach to physically compose a specified set of services by semantic schema matching between the API schemas of source and destination services.

2. Description of the Related Art

Within this application several publications are referenced by Arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

With the emergence of web services, an increasing number of organizations are putting their business competencies as a collection of web services. These components range from data sources to analytical tools and applications, and business objects. With such services becoming available, it is conceivable that other users could integrate them to create new value-added services in ways that were not anticipated by their business practices to the dynamic nature of the web. Thus, composing existing services to obtain new functionality will prove to be essential for both business-to business and business-to consumer applications.

Several web service development environments are currently offered in which tools are provided for manual composition of web services. Frequently this requires developers to examine the application program interface "APIS" (input and output messages) of web services and determine a correspondence between the message attributes in order to chain services during composition. While manual service composition can be accomplished through such explicit programming efforts, this is not only tedious in terms of development time and effort but also is not scalable as services are added or deleted. Efforts in Semantic Web [1] have tried to address this problem by explicitly declaring preconditions and effects of web services with terms precisely defined in ontologies. The set of web services to compose is determined using goal-directed planning and rule-based inference starting from a high-level specification of a desirable goal [4, 6]. When the composition sequence for services has been already specified in the query, automatic service composition reduces to finding corresponding attributes in the input and output messages of a chain of services to allow them to be physically invoked in a chain. Semantic Web approaches expect a close match in the source and destination ontological descriptions of messages of web services to enable their chaining. In practice, since the web services are derived from widely distributed sources, it is unlikely that similar terminology or abstract data structures are used in web services. In such cases, semantic information is necessary to discover the correspondence between source and destination.

FIG. 1 shows an example chain in which a data source is chained with an analytics application where the intention is to cluster the data produced by database web service. While this is a reasonable request from an end-user, automatically composing the two services actually requires flowing the correspondence between the attributes of the output message of the database web service (source) with the input message expected by KMeans web service (destination) as shown.

Notice that the names used to denote the attributes follow typical naming conventions used by programmers for class variables. Trying to assign friendly names following an ontology may not be possible in such cases, particularly when automatic Java to WSDL converters offered in today's tools are used to produce the WSDL documents.

The schemas representing the abstract data types characterizing the input and output messages of the destination and source services are shown in FIG. 1. From this figure, we can note a number of difficulties associated with matching of these schemas, namely, (1) the number of attributes in the schemas may not be the same, (2) the names of the attributes are frequently concatenation of abbreviated words so that direct lookup of an ontology for name similarity may not be sufficient as proposed in Semantic Web methods (3) the structural information in the schemas may need to be captured to disambiguate matches, (4) and type inference may be needed to detect similarity between attributes (eg., Int to float is lossless while float to int association results in loss of precision), (4) a source attribute may be split across multiple destination attributes, (5) multiple sets of attribute matches may be possible (6) some associations may depend on the existence of conversion functions (eg., 1D to 2 D Array Converter to convert double[ ] to double[ ][ ]).

SUMMARY OF THE INVENTION

Disclosed herein is a method of automatically matching schemas. This method begins by extracting schemas from sources and targets. Then, source and target attributes are extracted from the schemas. Each source schema will have multiple source attributes and each target schema will also have multiple target attributes. The invention represents the source attributes and the target attributes as nodes in a bipartite graph. This bipartite graph has edges between nodes that are related to each other. The invention also defines a plurality of similarity scores between each set of related nodes. Each of the similarity scores is based on a different context-specific cue of the attributes that the nodes represent. These context-specific cues can comprise lexical name, semantic name, type, structure, functional mappings, etc. The invention can then compute an overall weight for each edge in the bipartite graph by combining the similarity scores of each set of nodes that form an edge. In addition, the invention assembles an optimal matching of the schemas, so as to indicate the level of similarity between each of the source and target schemas. This matching maximizes both the number of source and target attributes matched as well as the match score measured in terms of the weights of the edges selected in the matching.

The weight of an edge represents the strength of relationship between the set of related nodes that form the edge. The similarity of the "structure" above, can comprises similarity of locations within hierarchical trees of the sources and targets. The similarity of the "type" above can be determined by recursively traversing at least one of language type hierarchy and abstract data type hierarchy in the source and target schemas. The sources and targets can comprise data sources, code fragments, software applications, data access services, analytical services, etc. The schemas represent abstract data types of input and output of the source and targets The process of matching schemas comprises matching an output message of an operation in a source to an input message of a target.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

Figure 1:
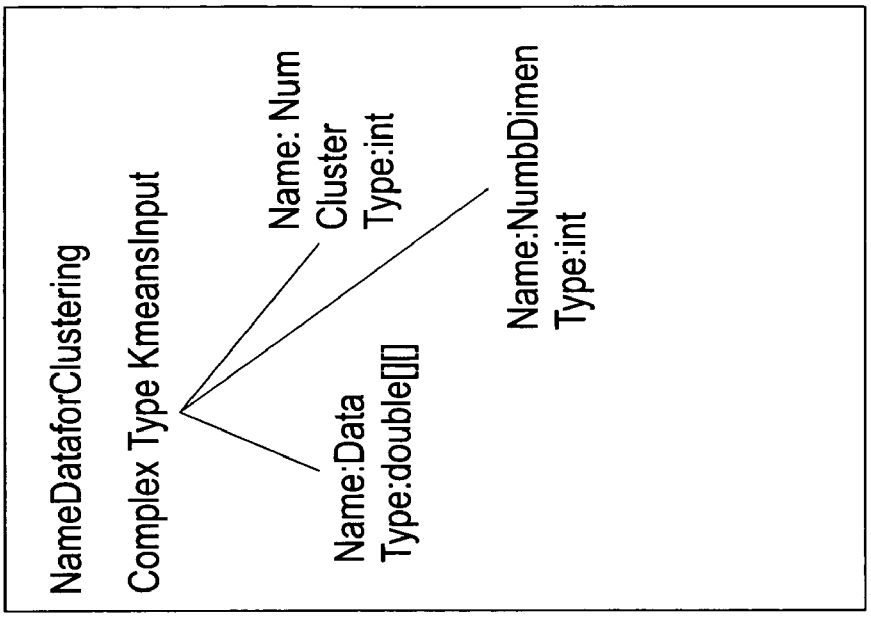
FIG. 1 is a schematic diagram that shows an example service chain in which a data source is chained with an analytics application.
Figure 1:
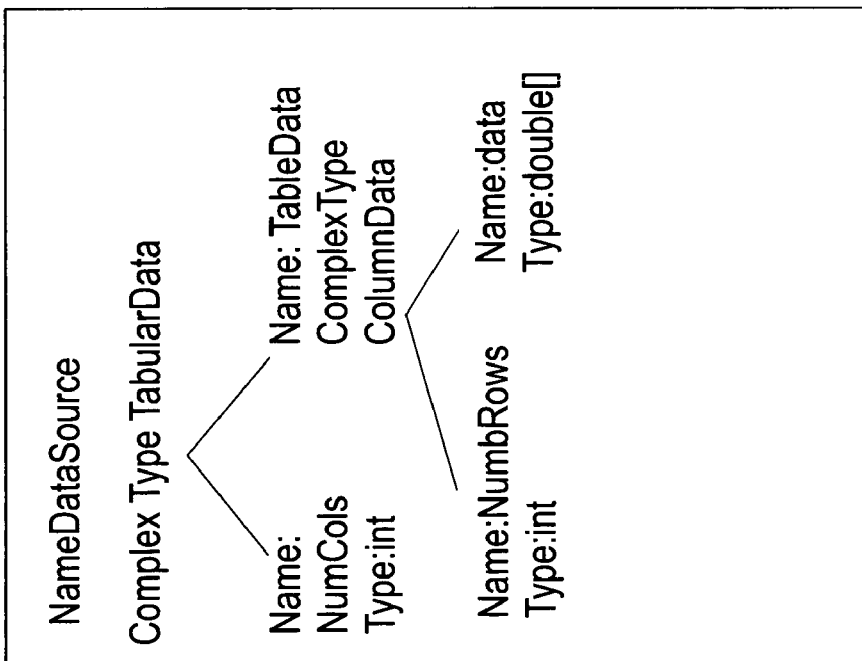
Figure 1:
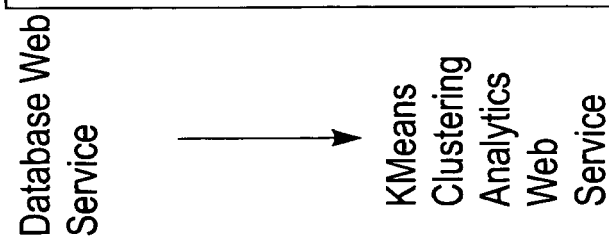

DETAILED DESCRIPTION OF PREFERRED
EMBODIMENTS OF THE INVENTION

With the emergence of web services, it has become desirable to automatically compose services to enable scalable business-to-business and enterprise application integration systems that reduce, at the same time, development time and effort. Automatically composing services, however, is a challenging problem since it is unlikely that web services derived from widely distributed sources use similar terminology or structure in their abstract data types to enable direct chaining. The invention presents an approach to physically compose a specified set of services by semantically matching schemas derived from the API specification of source and destination services Specifically, the invention models the correspondence between schemas as a problem of finding a maximum matching in a bipartite graph formed from the attributes of source and destination API schemas. The weights on the edges of the graph represent the similarity between the pairs of source and target attributes and are derived using cues, including, lexical and ontological similarity in names, their relation in a reference type hierarchy, conceptual grouping reflected in the structure of the schemas, and the existence of mapping functions between the attributes. The best possible matching between source and destination attributes is derived using a cost scaling network flow algorithm.

A motivating example is drawn from the domain of Life Sciences where the use of web services is becoming prevalent. With the sequencing of the human genome, a greater challenge now faces the scientists: to extract, analyze and integrate the information being populated in genome databases world-wide for improved diagnosis and cure of diseases. With advances in sequencing techniques and the advent of Gene Chips, increasingly large amounts of data is becoming available on a worldwide basis as a combination of public and private genome databases. In addition, increasing number of analytic tools are becoming available, including both commercial (e.g., ArrayScout, Discovery Studio, SpotFire), and public domain bioinformatics tools (BLAST, HMMER, Clustal-W). In most cases, the tools developed are meant to be standalone applications or deployed over the web. They are often written using a closed architecture, and come with built-in data assembly/access, analytics and visualization components. In addition, each tool uses proprietary data formats so that scientists often have to do a lot of document preparation before they can use such tools. With progress in Genomics, scientists have also begun to ask queries that often span more than one datasource and/or one or more analytic components. For example, a diagnosis that combines information from gene expression, blood test, and x-ray data may need to access, analyze and combine information in three separate data sources. To satisfactorily address the needs of scientists, therefore, an information integration framework is needed that can pull together both life sciences data and analytic applications from disparate sources. Such a framework must be scalable and dynamic as the distributed components that need to be integrated vary across organizations and over time. Web Services provide one mechanism to achieve such information integration. If all the distributed components can be described through web service description language, then dynamic information integration can be achieved through automatic service composition techniques. Automation in service composition relieves the burden of explicit programming in such scenarios, a fact that is very attractive to end users such as scientists who want to avoid the cost and development effort in programming.

Figure 2:
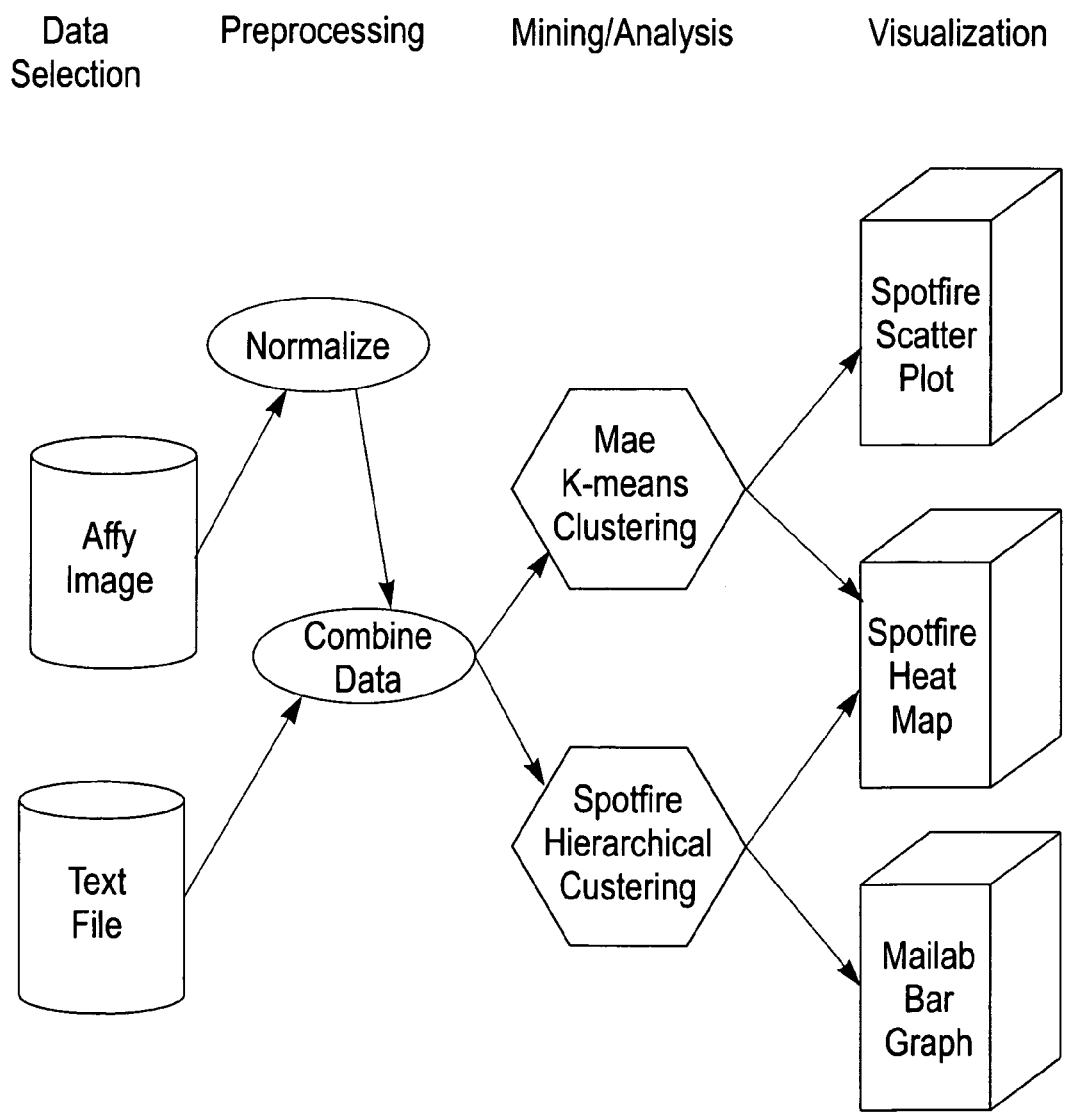
FIG. 2 is a schematic diagram that shows a data flow graph in which the normalized gene chip data is combined with data from a text file prior to clustering.

This invention presents a semantic schema matching algorithm to enable a specified service composition task. Here, it is assumed that the services that need to be composed and their composition order is pre-specified in a data flow graph such as the one shown in FIG. 2. The data flow graph is a directed acyclic graph in which the outgoing arcs represent data flows from one service to the next. Multiple outgoing arcs from a service implies the data produced by a service is sent to multiple services. Similarly, multiple incoming arcs imply the data from multiple services is needed for the functioning of the given service. Thus, FIG. 2 indicates a data flow graph in which the normalized gene chip data is combined with data from a text file prior to clustering using two different mechanisms (Kmeans and SpotFire algorithms) and the resulting data produced is sent to three different visualization services.

Figure 3:
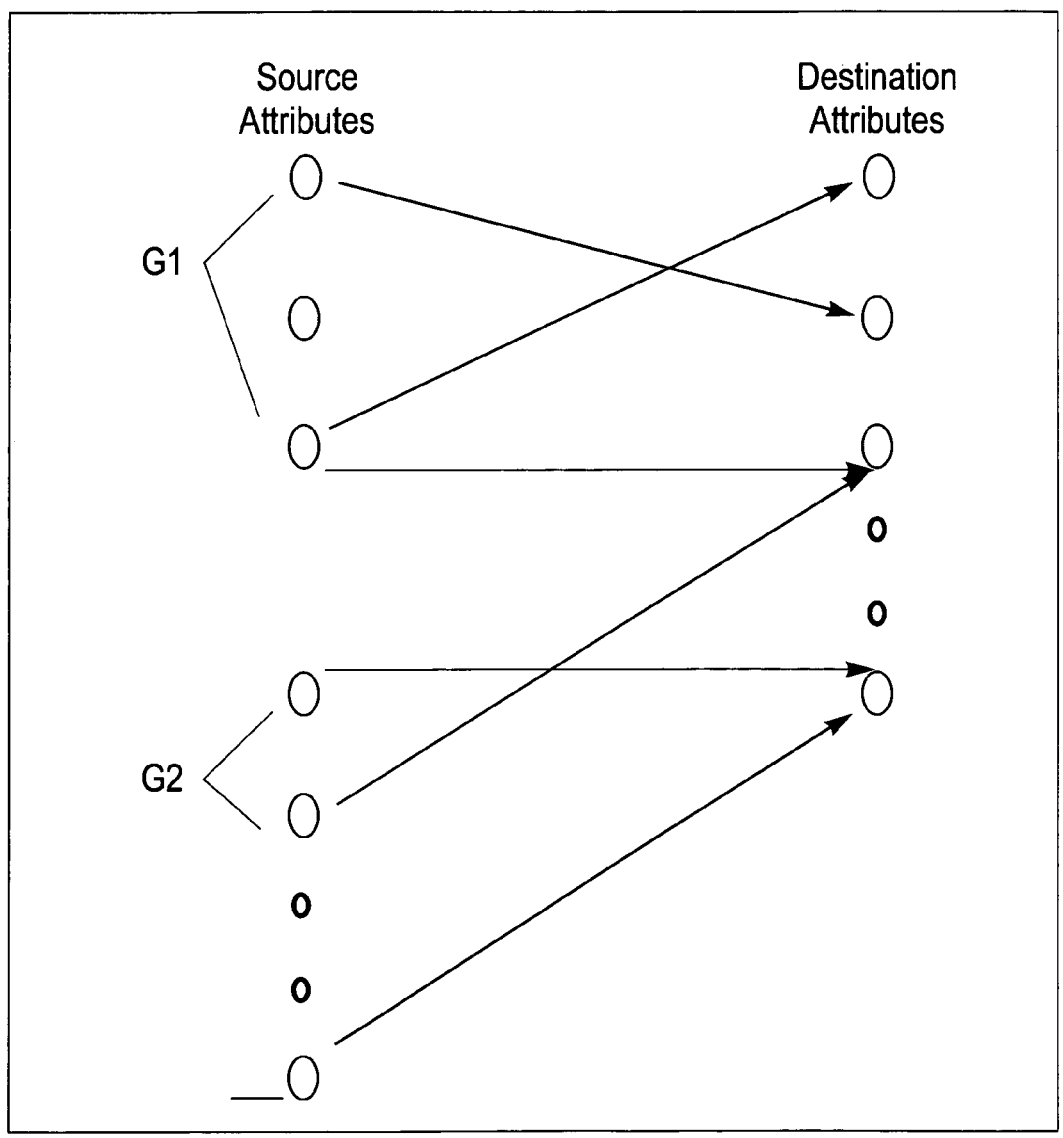
FIG. 3 is a bi-partite graph.

Automatic service composition can then be posed as the problem of finding pair-wise correspondence between the messages of adjacent services in the data flow graph. Let $G1, G2, Gk$ be k incoming edges from outgoing messages of services $G1, G2, \ldots Gk$ to a service $Gi$ in the data flow graph. Let there be mj attributes for the outgoing messages of each of the incoming services $Gj$. Let $aj1, aj2, ajmj$ denote the attributes in the incoming message of service $Gi$. Automatically composing the tuple $(Gi1, Gi2, Gik, Gi)$ then reduces to the problem of finding correspondence between the set of source attributes $a11, a12.a1m1, a21, a22, .a2m2, .ak1, ak2, akmk$ and the attributes of $Gi$ Consider now a graph $G=(V=X \cup Y, E, C)$ where the nodes X and Y represent the source and target nodes (attributes) and the edges E represent relationships between source and target attributes. The set C models the strength of the edges in E in terms of capturing attribute similarity so that $Cij=S(Ei, Ej)$ where S is a similarity function. A way to compute the similarity between the attribute nodes is described below. Since the aim is to derive the correspondence between source and destination attributes, it is sufficient to regard similarities between source and target attributes so that graph G becomes a bi-partite graph as shown in FIG. 3. Ideally, all of the target attributes must either have a match in the source attributes or be specified by end user as a user-guided parameter in order for the destination component to launch. The correspondence between the source and target attributes can be described as a matching in the bipartite graph. A matching is a set of edges of the bi-partite graph such that at most one edge is incident on either source or target nodes. A maximum cardinality match then refers to a matching with the maximum number of such one-to-one edges. Each such matching can also have a combined weight reflecting the strength of similarity between source and target attributes. A maximum-weight maximum cardinality matching, can therefore, capture the notion of finding the best set of matching attributes for the largest number of destination attributes. Knowing the correspondence determines the values to be assigned to destination attributes in order to launch the web service.

It is possible to extend one-to-one correspondence implied by a matching to cases where a destination attribute corresponds to a combination of source attributes by explicitly modeling such a combination as a new source attribute node. The maximum weight maximum cardinality matching algorithm we used is a variant of the algorithm described in [3]. This involves a reduction of the matching problem to the problem of computing a maximum flow in a flow network [2] A flow network $G=(V,E)$ is a directed graph in which each edge has a non-negative capacity $c(u,v)>=0$. In addition, two of the nodes in V are distinguishable as sources and sink t. A flow in G is a real-valued function $f:V \times V \rightarrow R$ that satisfies three properties, namely, capacity: $f(u,v)<=c(u,v)$, skew symmetry: $f(u,v)=-f(u,v)$, and conservation: i.e., net flow out of a node other than source and sink=0. The net flow in the network then is the total flow out of the source node. Finding the maximum flow in the network then corresponds to finding the maximum net flow out of the source node. Although on the surface, the two problems are seemingly unrelated, there is a close resemblance between the two problems as pointed by several authors [2]. The trick is to construct a flow network in which flows correspond to matching. Thus $V=V'=X \cup Y$. and $E=E'$ and capacity of $c(u,v)=1$. The flows are initialized as $f(v)=1$ for all v in X and $f(w)=-1$ for w in Y (this ensures that the matching proceeds from source to target). In addition, to handle the weight of matching in addition to the number of matchings, we introduce a cost function d(a) associated with each arc a, so that for arc $a=(v,w)$, we have $d(v,w)=-c(v,w)$. We extend the maximum flow problems to maximum flow with minimum cost by finding the cost function $cost(f)=sum (d(a) f(a))$ for all edges a. Minimizing cost(f) corresponds to maximizing the matchings weight (since $d(v,w)=-c(v,w)$), so that the result is a maximum weight maximum cardinality matching. The algorithm for finding such a flow uses a pre flow-push technique and is described in detail in [3].

In the case of API matching, the edge weights i.e., cost of matching represent the similarity between the attributes of the source and destination APIs. The invention derives the similarity between attributes using cues, namely, lexical name matching, semantic name matching, type matching, and structural matching. Each of the cues and ways of computing similarity between APIs is now described. The lexical names of similar attributes can often be spelled similarly. For example, the last name may be represented in API schemas as lastname, lastname, LastName, lname, lastnme, and similar variants. These names have a number of common literals occurring in the same order. Variants of string matching algorithms can be used to measure lexical similarity, the simplest among them being Knuth-Morris-Pratt algorithm allowing exact substring matching, to substring matching with insertions, deletions, and substitutions based on variants of dynamic programming such as the Longest Common Subsequence algorithm (LCS) [2], and Smith-Waterman (does local alignment based on dynamic programming)[11]. We refer to these algorithms as LCS schemes. The latter two algorithms are derived from bioinformatics literature [11]. Given a pair of source and destination attributes (A, B) in the bipartite graph, the lexical similarity L (A, B) measured using LCS algorithms can be expressed as $$L(A,B)=2\text{Length}(\text{LCS}(A,B))/(\text{Length}(A)+\text{Length}(B)) \qquad (1)$$

Where Length (LCS (A,B)) is the length of the longest (non-consecutive) common subsequence between the strings. Thus, lastname and lname would have an LCS of length 5 and the lexical similarity score will be $2*6/(9+5)=10/14=0.71$. The lexical similarity measure is good for capturing similarly spelled names with minor variations in the characters and capitalization common to naming of variables by programmers.

In Semantic Name Similarity, our method of computing semantic similarity in names is similar to the one in Cupid [5]. The invention first tokenizes the name to extract isolated words. We expand the abbreviation tokens to meaningful words. After removing stop words, their ontologically similar names are formed using a semantic ontology or thesaurus. At the end of this processing, let each pair of source and destination attributes (A,B) have m and n valid tokens and let Si and Sj be their expanded lists based on ontological processing. The invention considers each token i in source attribute A to match a token j in destination attribute B if i is in the list Sj or j is in the list Si synonym of Sj. The candidate matches again form a small bipartite graph in which each edge has flow of unit 1 (Note this graph is different from the overall API match graph). The maximum cardinality matching in this graph then denotes the best set of matching word tokens. The semantic name similarity measure is then given as $$\text{Sem}(A,B)=2*\text{MaxMatch}(A,B)/(m+n) \qquad (2)$$

In the Pre-Processing Example & Details, the tokenization of attribute names uses common naming conventions used by programmers. For example, LastName and lastname would both be split into Last and Name tokens. For each token extracted, we expand the token to form a meaningful name based on the common abbreviations employed by programmers. For example NumCols would be separated into Num and Cols and the tokens expanded to Numerals-Numbers and Columns respectively. The expansion relies on a dictionary of expansions that we have accumulated over time by observing the abbreviations used by programmers. All stop word tokens are then discarded. A stop word list available on the web can be consulted for this purpose. Some adaptation had to be performed for the context of APIs. The resulting tokens are further expanded using ontological information. In the presence of a domain ontology, we collect all ontological terms that are immediate siblings and the successive parents of a word up to a specified number of levels (3, in our case). In the absence of a domain ontology (or in addition to domain ontology), we use the English language ontological information from the WordNet thesaurus to include synonyms of the word based on nouns and adjectives [8]. Thus, a word such as CustomerCategory would form the expansion set customer, client, consumer category, class, family based on noun synonyms.

Figure 4:
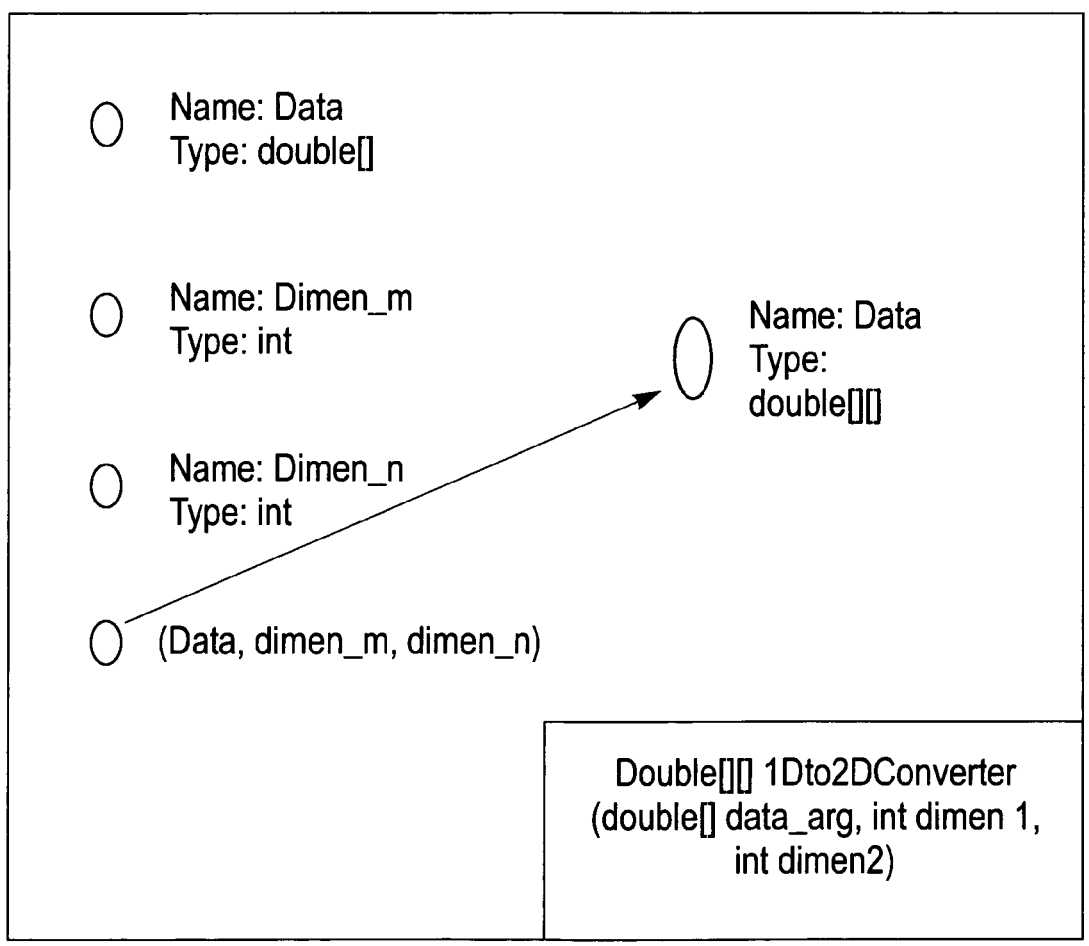
FIG. 4 is a bi-partite graph.

In Reference Type Similarity for APIs the type of attributes is a strong cue in matching. Specifically, unless the type can be properly casted, the destination component cannot be launched even if the matching says otherwise. Therefore, we capture the reference type similarity into the matching metric. Specifically, we navigate the reference type hierarchy in a language (Java in our case) to determine if the type of an attribute can be cast in a lossless or lossy manner. If the conversion is possible but will cause a loss of data (e.g., float to int conversion), then, we attach a lower weight. Lossless type conversion (e.g., int to float) and other equivalent subclass type inheritance and polymorphism are all given equal weight. If the similarity cannot be inferred using the reference type hierarchy, then we look for explicit user-defined data type conversion functions. For example, a 2D to 1D type conversion is not allowed in the reference type hierarchy but can be achieved through an explicitly written conversion function. This match is determined when a combination of source attributes form the API signature of a conversion function with the output type being the type of the destination attributes. If more than one source attribute is involved in the API signature of the conversion function, then a new node is created in the overall bipartite graph representing the combination and an edge is added between the new node and the destination attribute. In that case no edge will exist between the source and destination attributes directly but rather through the combined node edge. FIG. 4 gives an example.

The reference type similarity measure is then given by
1.0 for lossless type conversion
  or if type conversion function exists $$\text{Type}(A,B) = 0.5 \text{ for lossy type conversion } 0.0 \text{ otherwise} \quad (3)$$

In structural similarity, the invention exploits the structure inherent in the schemas during matching to account for similarly named attributes being found at more than one level in the schema. Each level in the schema represents a concept grouping in which programmers capture a data abstraction. The attributes (leaf nodes) at a depth level in the schema tree reflect a concept grouping at that level. Thus structural similarity in the attributes is measured by the difference in the tree depth at which the attribute occurs. The structural similarity is given by $$\text{Struct}(A,B) = 1 - (|D(A) - D(B)|/\max D(Gi), D(Gj)) \quad (4)$$

where $D(A)$ and $D(B)$ are the depths of the attributes in their respective schema trees Ci and Gj. $D(Gi)$ and $D(Gj)$ represent the maximum depth in the schema trees respectively.

Overall cost function for computing the edge cost in the bipartite graph

All four cues are combined to define the cost of the edge in the bipartite graph as $$C(A,B) = \alpha_1 * L(A,B) + \alpha_2 * \text{Sem}(A,B) + \alpha_3 * \text{Type}(A,B) + \alpha_4 \text{Struct}(A,B) \quad (5)$$

The above graph-theoretic formulation allows the best set of matching attributes in the APIs of the exposed methods of web services to be determined. Note that the maximum matching in a bipartite graph need not be unique. The algorithm produces a candidate match which can be viewed manually and edited if unsuitable. Conversely, if no good matching can be produced, the algorithm flags the composer of web service chain that perhaps the two functions are not meant to be composed since there is not enough resemblance between their attributes either in terms of name, meaning, type or forced conversion functions. Thus, it can help in determining if two services can be composed.

Since the bipartite graph is small (usually less than 20 nodes on each side), the algorithm converges within a few iterations so that it can be deployed on-the-fly. This can be deployed in an offline process per pair of web services as the matching need be computed only once (unless the web service specification itself has changed).

Figure 5:
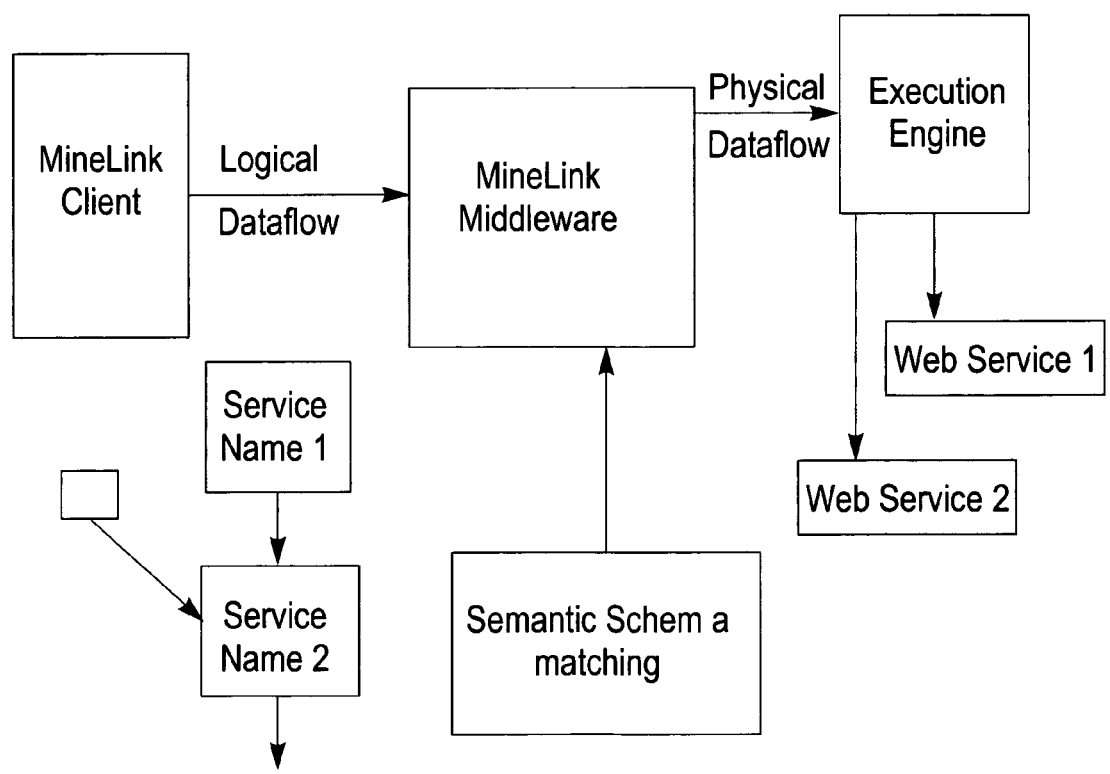
FIG. 5 is a schematic diagram illustrating logical and physical data flow through hardware elements.

We have developed a system called MineLink to enable dynamic service composition. The architecture of the system is described in FIG. 5. Any distributed component wrapped as a web service can be registered in MineLink via the MineLink client, an Eclipse plug-in that allows drag-drop component integration through data flows. The dataflows capture the logical composition of their underlying web services. The logical dataflow is expressed in BPEL syntax converted to a physical dataflow by the MineLink middle-ware using semantic schema matching between successive services in the data flow. The physical dataflow can now be executed by an underlying engine such as a database (if the dataflow consists of data read/writes/updates) or BPEL engine. When a new component is registered in MineLink, the expert user/system administrator indicates possible service composition scenarios using the newly added service. The semantic schema matching between the identified pairs of services produced by MineLink is verified by the administrators and any corrections if required, are made and the mapping stored in a database. Given an end-user/lay user request for an information integration task that involved composition of specific services, the semantic schema mapping stored is looked up to do the necessary API conversions.

In the results section, the invention presents results of semantic schema matching for sample API schemas and discusses the accuracy over a larger number of web services. To illustrate semantic schema mapping, consider two services and their schemas described in FIG. 1. These depict a typical composition task in an information integration scenario where a data access service is chained with an analytic service. The mapping produced by our matching is shown in Table 1. The matching above a score threshold of 0.6 are shown. The contributions from each of the cues used in matching are listed in Column 5.

| S. No. | Source Attribute | Matching Destination Attribute | Matching Score | Contributions In order |
|---|---|---|---|---|
| 1. | Data | Data | 0.875 | 1.0, 1.0, 1.0, 0.5 |
| 2. | Num Cols. | Numb Dimen. | 0.85 | 0.4, 1.0, 1.0, 1.0 |

Figure 6:
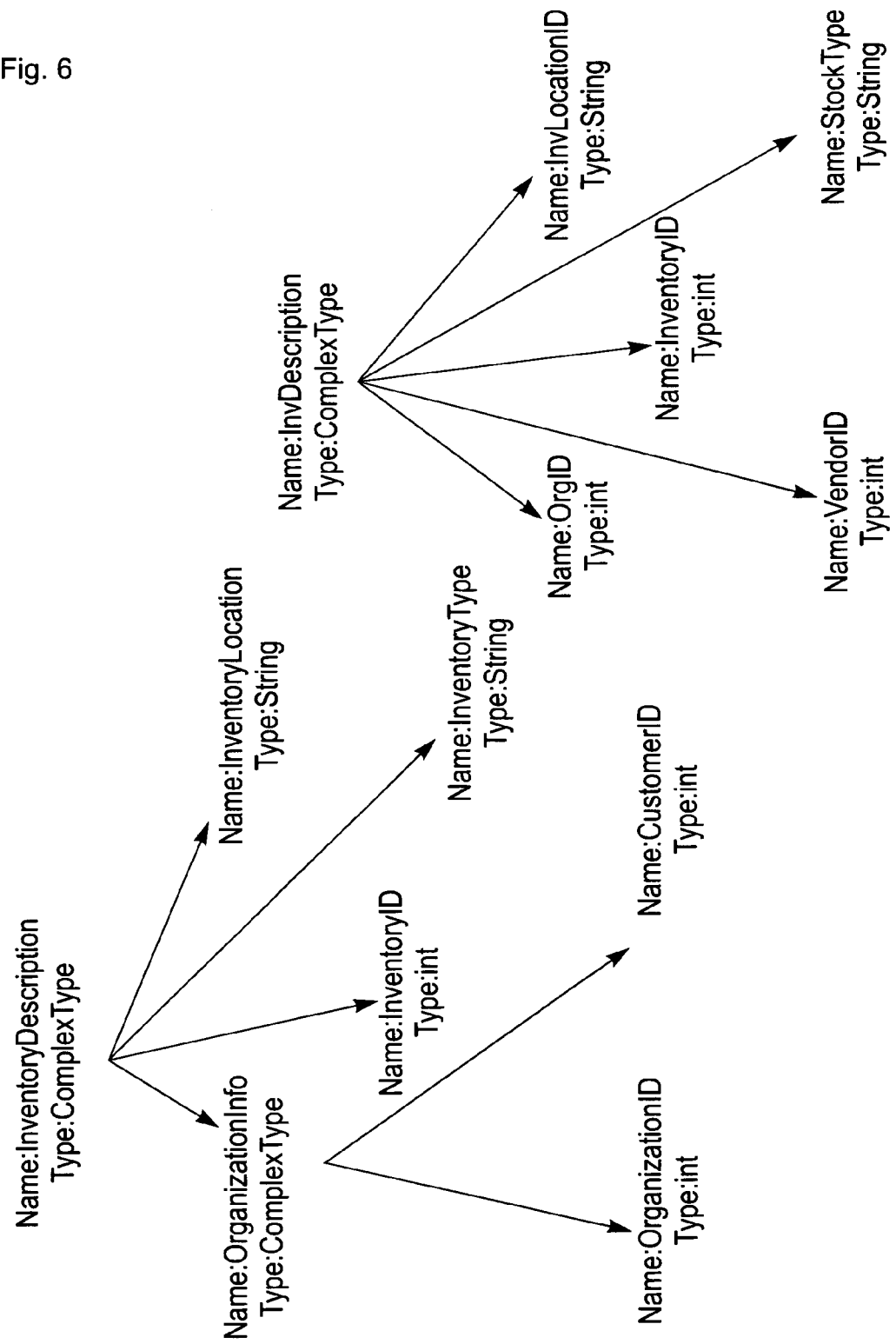
FIG. 6 is a schematic diagram illustrating a second example of semantic schema matching for web service composition.

FIG. 6 illustrates a second example of semantic schema matching for web service composition. Here a web service that provides a description of an inventory item indexed by an inventoryID that is chained with a web service that retrieves vendor information associated with the inventory item. The matched produced are indicated in Table 2. As can be noted, a correspondence between InventoryType and Stock-Type has been aided by semantic name matching. Similarly, abbreviation expansion has allowed match of InvLocationID to InventoryLocationID.

| S. No. | Source Attribute | Matching Destination Attribute | Matching Score | Contributions In order |
|---|---|---|---|---|
| 1. | Organization ID | OrgID | 0.7925 | 0.67, 1.0, 1.0, 1.0, 0.5 |
| 2. | Inventory Location | InvLocationID | 0.8525 | 0.74, 0.67, 1.0, 1.0 |
| 3. | Inventory ID | InventoryID | 1.0 | 1.0, 1.0, 1.0, 1.0 |

| S. No. | Source Attribute | Matching Destination Attribute | Matching Score | Contributions In order |
|---|---|---|---|---|
| 4. | Inventory Type | Stock Type | 0.89 | 0.56, 1.0, 1.0, 1.0 height |

Figure 7:
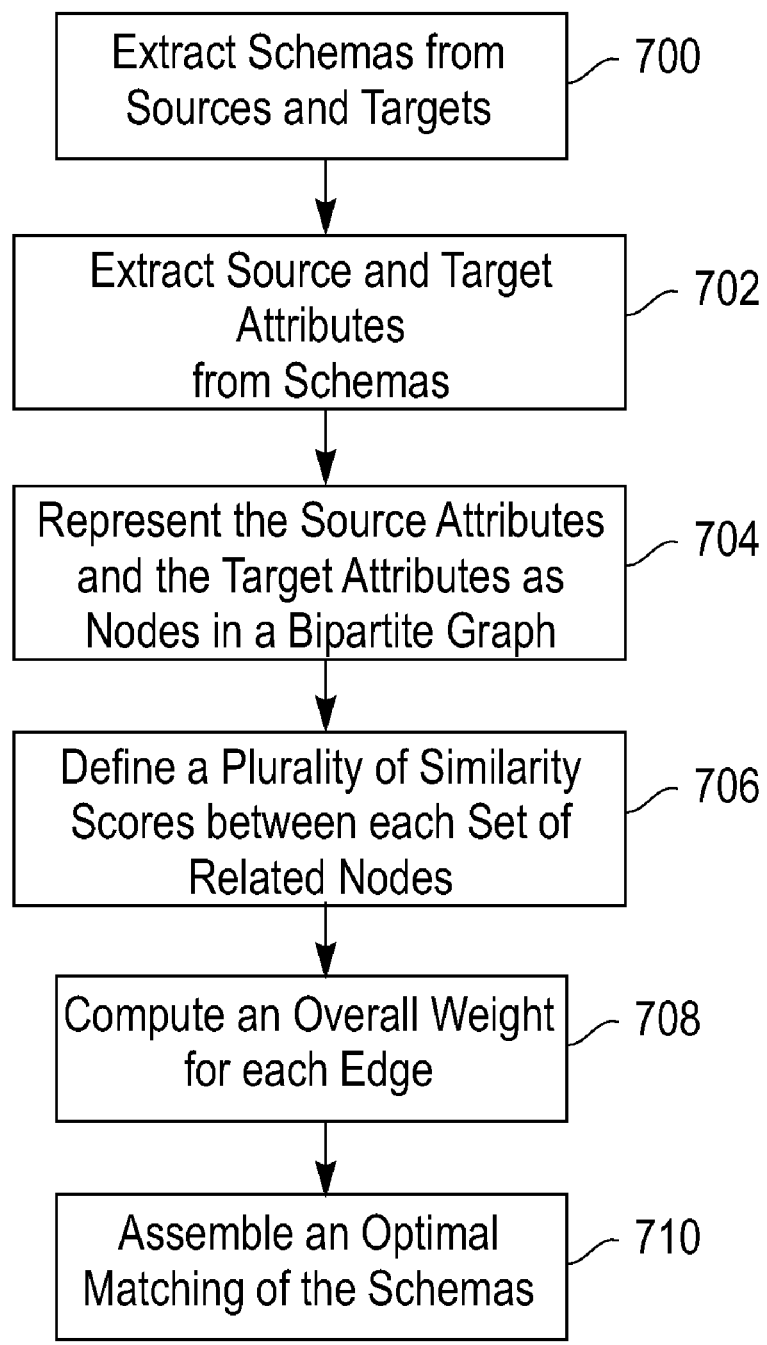
FIG. 7 is a flow diagram illustrating a preferred method of the invention.

The flowchart in FIG. 7 summarizes the operation of one aspect the invention. More specifically, in item 700, schemas are extracted from sources and targets. Then, source and target attributes are extracted from the schemas in item 702. Each source schema will have multiple source attributes and each target schema will also have multiple target attributes. The invention represents the source attributes and the target attributes as nodes in a bipartite graph in item 704. This bipartite graph has edges between nodes that are related to each other. The invention also defines a plurality of similarity scores between each set of related nodes in item 706. Each of the similarity scores is based on a different context-specific cue of the attributes that the nodes represent. These context-specific cues can comprise lexical name, semantic name, type, structure, functional mappings, etc. The invention can then compute an overall weight for each edge (in item 708) in the bipartite graph by combining the similarity scores of each set of nodes that form an edge. In addition, the invention assembles an optimal matching of the schemas in item 710. This matching maximizes both the number of source and target attributes matched as well as the match score measured in terms of the weights of the edges selected in the matching.

Figure 8:
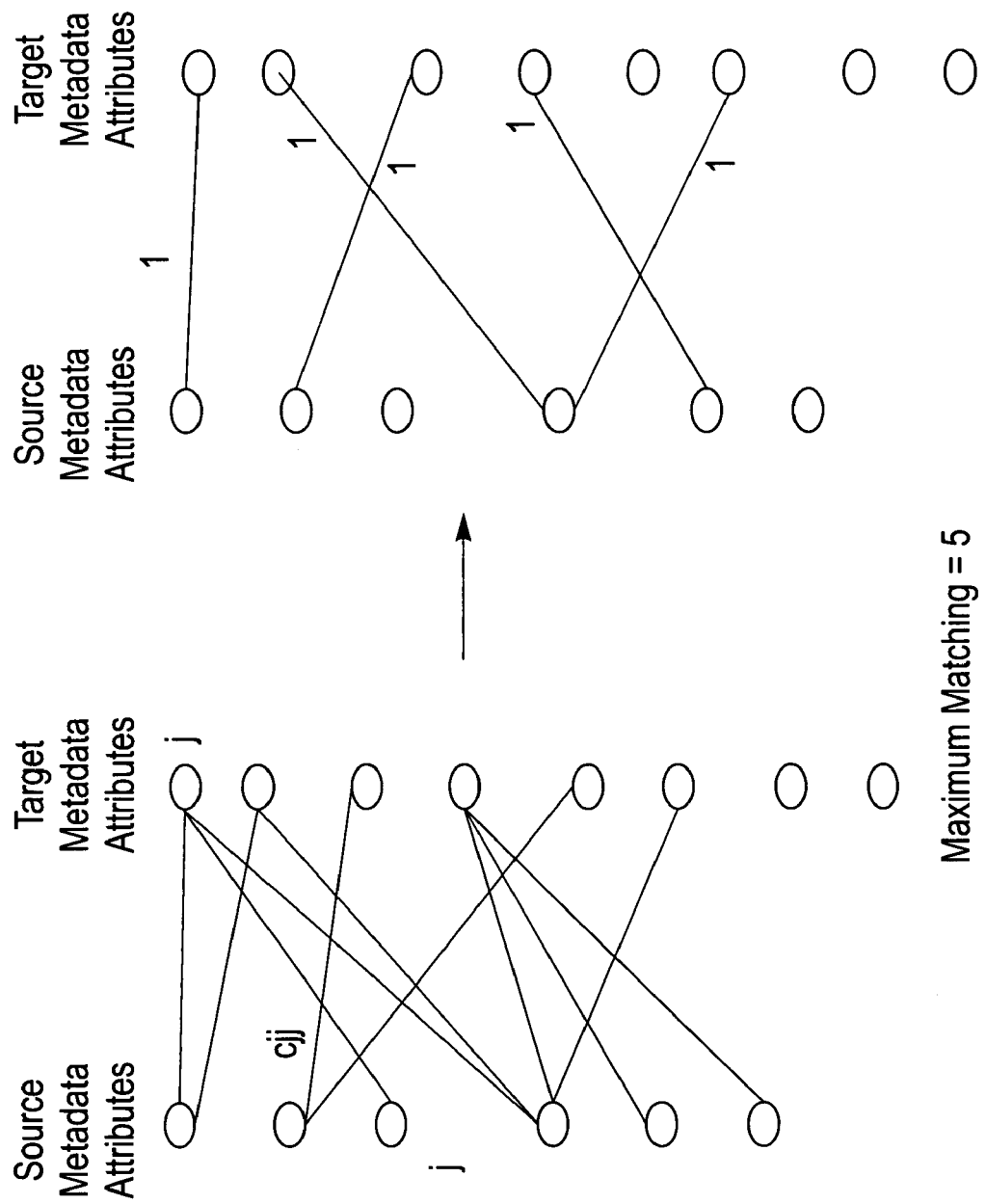
FIG. 8 is an illustration of the bipartite graph and a maximum cardinality matching derived from the graph.

The invention, as described above, extracts all attributes from the source and destination schema. These now form the source and target nodes of the bipartite graph. The invention draws an edge from a source node to a target node if they have a similarity score above a threshold based on one or more of the cues mentioned above (i.e. lexical match in name, semantic match in name, structural match, etc.). The overall similarity score returned by the matching metric then becomes the weight on the edge. A matching is a subset of these edges such that each source and target have at most one incident edge on the node as shown in FIG. 8. A maximum cardinality match is matching of maximum cardinality, i.e., highest number of edges that are still uniquely incident.

Since there can be many maximum cardinality matches, we choose those that have the maximum combined weight. The combined weight in our case is simply the addition of weights of the edges that are retained in the matching. We use the cost-scaling network flow algorithm of Godldberg and Kennedy (also described on page 8) for the actual implementation. Illustration of the bipartite graph and a maximum cardinality matching derived from the graph.

The weight of an edge represents the strength of relationship between the set of related nodes that form the edge. The similarity of the "structure" above can comprise similarity of locations within hierarchical trees of the sources and targets. The similarity of the "type" above can be determined by recursively traversing at least one of language type hierarchy and abstract data type hierarchy in the source and target schemas. The sources and targets can comprise data sources, code fragments, software applications, data access services, analytical services, etc. The schemas represent abstract data types of input and output messages of the source and targets. The process of extracting schemas comprises matching an output message of an operation in a source to an input message of a target.

Figure 9:
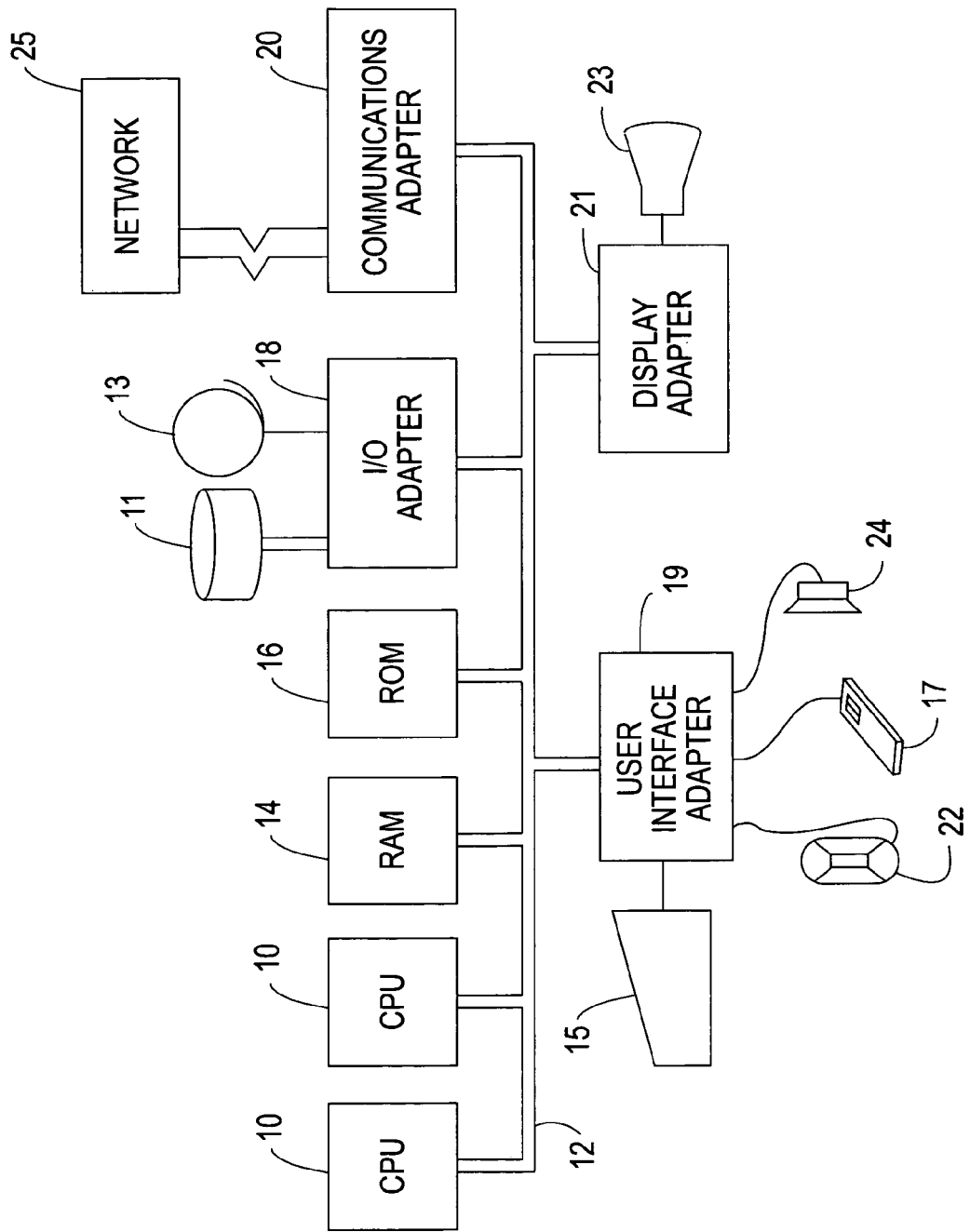
FIG. 9 is a schematic diagram of hardware that can be used with the invention

A representative hardware environment for practicing the embodiments of the invention is depicted in FIG. 9. This schematic drawing illustrates a hardware configuration of an information handling/computer system in accordance with the embodiments of the invention. The system comprises at least one processor or central processing unit (CPU) 10. The CPUs 10 are interconnected via system bus 12 to various non-transitory devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The performance of semantic schema matching was tested on 240 distinct pairs of web services in a chain. We then measured the performance by comparing to a manual match of the attributes of the respective schemas. The number of spurious (false positives), as well as missing matches (false negative) were noted in each pairwise match. Representative performance for a sampling of web services is illustrated in Table 3. To obtain statistically valid measurements, we chose web services for handling generic business objects (GBO). The GBOs tend to have a larger number of member attributes (could be over 100) so that the algorithms performance could be gauged on a large schema. Overall, the system erred on the side of making false positives and was able to maintain a matching accuracy in the range of 75.

| S. No | # Source Attributes | # Destination Attributes | # Correctly Matched | # Missed Matches | # Spurious Matches | # Actual Matches | % Accuracy |
|---|---|---|---|---|---|---|---|
| 1. | 10 | 15 | 8 | 1 | 2 | 9 | 81% |
| 2. | 23 | 34 | 28 | 3 | 7 | 31 | 81.57% |
| 3. | 67 | 73 | 29 | 5 | 9 | 34 | 79% |
| 4. | 84 | 56 | 10 | 3 | 4 | 13 | 76.4% |

As can be seen from the above results, composition of services can be aided by automatic schema matching. The performance indicates that this way of composing services may be a valuable supplement to tools that allow composition through manual matching of attributes in a GUI. Each of the cues help in determining the match in different ways. The lexical match of names is useful when the names are already nearly identical (e.g., cusomterid, CustomerID), and in the case of abbreviated names (CustID, CustomerID). The semantic name matching helps in cases where names of similar meaning are used to refer to member attributes and the referred context is the same, eg., (ClientID,CustomerID), but could be off-base when different senses of the words meant in different context can match. The type cue is very reliable for API matching. However, it can generate a number of false positives when the attributes have same types (e.g., Lot of matches to in and string types). Finally, the structural cue helps relatively less often, but is useful to resolve matches when the similarly named attributes occur at multiple levels in the schema.

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

Although the present invention of semantic schema matching is described above in the context of API matching in web services, one ordinarily skilled in the art would understand that the technique can also be applied for a variety of applications in which schemas can be extracted from data elements. Thus, if the schemas are derived from code APIs (e.g., Java classes, or C++ code), then this method can be used to automatically compose code fragments in an integrated development environment (IDEs). It can also be embedded in a distributing computing middleware broker such as CORBA or J2EE brokers to orchestrate component integration.

The embodiments of the invention include a method of automatically matching schemas comprising extracting source and target schemas from sources and targets; extracting source and target attributes from said schemas, wherein each source schema will have multiple source attributes and each target schema will have multiple target attributes; representing said source attributes and said target attributes as nodes in a bipartite graph, wherein said bipartite graph has edges between nodes that are related to each other; defining a plurality of similarity scores between each set of related nodes, wherein each of said similarity scores is based on a different context-specific cue of said attributes that said nodes represent, wherein context-specific cues comprise lexical name, semantic name, type, structure, and functional mappings; computing an overall weight for each edge in said bipartite graph by combining said similarity scores of each set of nodes that form an edge; obtaining an optimal matching between said source and target schemas by maximizing the number of nodes matched and maximizing the weight of selected edges to produce a matching score; and ranking such matching according to weights of said edges between said related nodes, for matchings having the same number of nodes.

While the invention has been described in terms of preferred embodiments, those skilled in the art will recognize that the invention can be practiced with modification within the spirit and scope of the appended claims.

REFERENCES

[1] Berners-Lee et al. The semantic web Scientific American, 2001.
[2] T. H. Cormen, C E. Lieserson, and R. L. Rivest. Introduction to Algorithms. New York: McGraw Hill, Cambridge: MIT Press, 1990.
[3] A. Goldberg and Kennedy. An efficient cost-scaling algorithm for the assignment problem. SIAM Journal on Discrete Mathematics, 6(3):443-59, 1993.
[4] Blythe J. et al. The role of planning in grid computing. In Proc. ICAPS, 2003.
[5] Jayant Madhavan, Philip A. Bernstein, and Erhard Rahm. Generic schema matching with cupid. In The VLDB Journal, pages 49-58, 2001.
[6] D. McDermott. Estimated regression planning for interactions with web services. In Proc. AIPS, 2002.
[7] S. Milnik et al. Similarity flooding: A versatile graph matching algorithm and its application to schema matching. In Proc. ICDE, 2002.
[8] G. A. Miller. Wordnet: A lexical database for english. Communications of the ACM, 38(11'):39-1, 1995.
[9] Renée J. Miller, Mauricio A. Hernández, Laura M. Haas, Lingling Yan, C. T. Howard Ho, Ronald Fagin, and Lucian Popa. The Clio project: managing heterogeneity. SIGMOD Record (ACM Special Interest Group on Management of Data), 30(1):78-83, 2001.
[10] Evren Sirin, James Handler, and Bijan Parsia. Semi-automatic composition of web services using semantic descriptions.
[11] T. F. Smith and M S. Waterman. Identification of common molecular subsequences. Jl. of Mol. Biol., 147:195-197, 1981.

What is claimed is:

1. A computer-implemented method of automatically matching schemas comprising:
   extracting schemas from sources and targets, using a computer;
   extracting source and target attributes from said schemas, using said computer, wherein each source schema extracted from said sources will have multiple source attributes and each target schema extracted from said targets will have multiple target attributes;
   representing said source attributes and said target attributes as nodes in a bipartite graph, using said computer, wherein said bipartite graph has edges between source and target nodes that are related to each other;
   defining a plurality of similarity scores between each set of related nodes, wherein each of said similarity scores is based on a different context-specific cue of said attributes that said nodes represent, using said computer, wherein context-specific cues comprise lexical name, semantic name, type, structure, and functional mappings;
   computing an overall weight for each edge in said bipartite graph by combining said similarity scores of each set of nodes that form an edge, using said computer;
   obtaining an optimal matching between said source and target schemas by maximizing the number of nodes matched and maximizing the weight of selected edges to produce a matching score, using said computer;
   ranking such matching according to weights of said edges between said related nodes, for matchings having the same number of nodes, using said computer; and
   outputting the matching nodes from said computer, said extracting of said schemas from said sources and targets comprising matching an output message of an operation in a source to an input message of a target.

2. The method according to claim 1, wherein said weight of an edge represents the strength of relationship between the set of related nodes that form said edge.

3. The method according to claim 1, wherein said structure comprises locations within hierarchical trees of said sources and targets.

4. The method according to claim 1, wherein said defining of said plurality of similarity scores comprises determining similarity of type by recursively traversing at least one of language type hierarchy and abstract data type hierarchy in said source and target schemas.

5. The method according to claim 1, wherein said sources and targets comprise at least one of data sources, code fragments, software applications, data access services, analytical services.

6. The method according to claim 1, wherein said schemas represent abstract data types of input and output messages of said source and targets.

7. A computer-implemented method of automatically matching schemas comprising:
   extracting schemas from sources and targets, using a computer;
   extracting source and target attributes from said schemas, using said computer, wherein each source schema extracted from said sources will have multiple source attributes and each target schema extracted from said targets will have multiple target attributes;
   representing said source attributes and said target attributes as nodes in a bipartite graph, using said computer, wherein said bipartite graph has edges between source and target nodes that are related to each other;
   defining a plurality of similarity scores between each set of related nodes, using said computer, wherein each of said similarity scores is based on a different context-specific cue of said attributes that said nodes represent;
   computing an overall weight for each edge in said bipartite graph by combining said similarity scores of each set of nodes that form an edge, using said computer;
   obtaining an optimal matching between said source and target schemas by maximizing the number of nodes matched and maximizing the weight of selected edges to produce a matching score, using said computer;
   ranking such matching according to weights of said edges between said related nodes, for matchings having the same number of nodes, using said computer; and
   outputting the matching nodes from said computer,
   said extracting of said schemas from said sources and targets comprising matching an output message of an operation in a source to an input message of a target.

8. The method according to claim 7, wherein said weight of an edge represents the strength of relationship between the set of related nodes that form said edge.

9. The method according to claim 7, wherein said context-specific cues comprise lexical name, semantic name, type, structure, and functional mappings.

10. The method according to claim 9, wherein:
   said structure comprises locations within hierarchical trees of said sources and targets; and
   said defining of said plurality of similarity scores comprises determining similarity of type by recursively traversing at least one of language type hierarchy and abstract data type hierarchy in said source and target schemas.

11. The method according to claim 7, wherein said sources and targets comprise at least one of data sources, code fragments, software applications, data access services, analytical services.

12. The method according to claim 7, wherein said schemas represent abstract data types of input and output messages of said source and targets.

13. A non-transitory storage device readable by machine, tangibly embodying a program of instructions executable by the machine to perform a method of automatically matching schemas, said method comprising:
   extracting source and target schemas from sources and targets;
   extracting source and target attributes from said schemas, wherein each source schema extracted from said sources will have multiple source attributes and each target schema extracted from said targets will have multiple target attributes;
   representing said source attributes and said target attributes as nodes in a bipartite graph, wherein said bipartite graph has edges between source and target nodes that are related to each other;
   defining a plurality of similarity scores between each set of related nodes, wherein each of said similarity scores is based on a different context-specific cue of said attributes that said nodes represent, wherein context-specific cues comprise lexical name, semantic name, type, structure, and functional mappings;
   computing an overall weight for each edge in said bipartite graph by combining said similarity scores of each set of nodes that form an edge;
   obtaining an optimal matching between said source and target schemas by maximizing the number of nodes matched and maximizing the weight of selected edges to produce a matching score;
   ranking such matching according to weights of said edges between said related nodes, for matchings having the same number of nodes; and
   outputting the matching nodes,
   said extracting of said schemas from said sources and targets comprising matching an output message of an operation in a source to an input message of a target.

14. The program storage device according to claim 13, wherein said weight of an edge represents the strength of relationship between the set of related nodes that form said edge.

15. The program storage device according to claim 13, wherein said structure comprises locations within hierarchical trees of said sources and targets.

16. The program storage device according to claim 13, wherein said defining of said plurality of similarity scores comprises determining similarity of type by recursively traversing at least one of language type hierarchy and abstract data type hierarchy in said source and target schemas.

17. The program storage device according to claim 13, wherein said sources and targets comprise at least one of data sources, code fragments, software applications, data access services, analytical services.

18. The program storage device according to claim 13, wherein said schemas represent abstract data types of input and output messages of said source and targets.

* * * * *